(12) United States Patent
Bar-Or Tillinger et al.

(10) Patent No.: US 11,856,584 B2
(45) Date of Patent: Dec. 26, 2023

(54) DOWNLINK CONTROL INFORMATION FOR SCHEDULING COMMUNICATIONS USING DIFFERENTIAL INFORMATION

(71) Applicant: QUALCOMM Incorporated, San Diego, CA (US)

(72) Inventors: Amit Bar-Or Tillinger, Tel-Aviv (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/327,335

(22) Filed: May 21, 2021

(65) Prior Publication Data
US 2022/0377782 A1    Nov. 24, 2022

(51) Int. Cl.
*H04W 72/23* (2023.01)
*H04W 72/0446* (2023.01)
*H04W 72/0453* (2023.01)
*H04W 72/50* (2023.01)

(52) U.S. Cl.
CPC ....... *H04W 72/23* (2023.01); *H04W 72/0446* (2013.01); *H04W 72/0453* (2013.01); *H04W 72/535* (2023.01)

(58) Field of Classification Search
CPC ......... H04W 72/1289; H04W 72/0446; H04W 72/0453; H04W 72/1257
See application file for complete search history.

(56) References Cited

U.S. PATENT DOCUMENTS

| 2010/0115358 A1* | 5/2010 | Kotecha | H04L 1/1812 |
| | | | 714/748 |
| 2012/0009923 A1* | 1/2012 | Chen | H04L 5/0053 |
| | | | 455/434 |
| 2020/0107336 A1 | 4/2020 | Yang et al. | |

FOREIGN PATENT DOCUMENTS

WO   WO-2014107903 A1 *  7/2014  ........... H04L 5/0037

OTHER PUBLICATIONS

Alcatel-Lucent et al: "DCI Overhead Reduction for CA", R1-112406, XP050537807, Aug. 18, 2011.*
Alcatel-Lucent., et al., "DCI Overhead Reduction for CA", 3GPP Draft, 3GPP TSG RAN WG1 Meeting #66, R1-112406, DCI Overhead Reduction for CA, 3rd Generation Partnership Project (3GPP), Mobile Competence Centre, 650, Route Des Lucioles, F-06921, Sophia-Antipolis Cedex, France, vol. RAN WG1. No. Athens, Greece, Aug. 22, 2011-Aug. 26, 2011, Aug. 18, 2011 (Aug. 18, 2011), XP050537807, 4 pages, [retrieved on Aug. 18, 2011], section 3, 4 p. 4, Differential DCI format for group DL/UL transmissions to multiple UEs with MCS delta, The whole document.
International Search Report and Written Opinion—PCT/US2022/071749—ISA/EPO—dated Jun. 30, 2022.

* cited by examiner

*Primary Examiner* — Brenda H Pham
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) that schedules a communication, wherein the DCI indicates information for one or more parameters of the communication using differential information associated with information included in an anchor DCI. The UE may transmit or receive the communication based at least in part on receiving the DCI. Numerous other aspects are described.

30 Claims, 9 Drawing Sheets

500 →

DCI format 1_1

| Field | No. of Bits |
|---|---|
| Identifier for DCI formats | 1 |
| Carrier indicator | 0 or 3 |
| Bandwidth part indicator | 0, 1, or 2 |
| Frequency domain resource assignment | N |
| Time domain resource assignment | 0, 1, 2, 3, or 4 |
| VRB-to-PRB mapping | 0 or 1 |
| PRB bundling size indicator | 0 or 1 |
| Rate matching indicator | 0, 1, or 2 |
| ZP CSI-RS trigger | 0, 1, or 2 |
| TB1 — Modulation and coding scheme | 5 |
| TB1 — New data indicator | 1 |
| TB1 — Redundancy version | 2 |
| TB1 — Modulation and coding scheme | 5 |
| TB1 — New data indicator | 1 |
| TB1 — Redundancy version | 2 |
| HARQ process number | 4 |
| Downlink assignment index | 0, 2, or 4 |
| TPC command for scheduled PUCCH | 2 |
| PUCCH resource indicator | 3 |
| PDSCH-to-HARQ feedback timing indicator | 0, 1, 2, or 3 |
| Antenna ports | 4, 5, or 6 |
| Transmission configuration indication | 0 or 3 |
| SRS request | 2 or 3 |
| CBG transmission information | 0, 2, 4, 6, or 8 |
| CBG flushing out information | 0 or 1 |
| DMRS sequence initialization | 1 |

505 Information to be potentially removed, Use same value as a previous DCI

510 Information to be potentially reduced,
00 – decrease by 2
01 – decrease by 1
10 – same
11 – increase by 1

515 Information to be potentially removed, Use same value as a previous DCI

FIG. 5

DOWNLINK CONTROL INFORMATION FOR SCHEDULING COMMUNICATIONS USING DIFFERENTIAL INFORMATION

FIELD OF THE DISCLOSURE

Aspects of the present disclosure generally relate to wireless communication and to techniques and apparatuses for downlink control information (DCI) for scheduling communications using differential information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving downlink control information (DCI) that schedules a communication, wherein the DCI indicates information for one or more parameters of the communication using differential information associated with information included in an anchor DCI; and transmitting or receiving the communication based at least in part on receiving the DCI.

In some aspects, a method of wireless communication performed by a base station includes transmitting, to a UE, DCI that schedules a communication, wherein the DCI indicates information for one or more parameters of the communication using differential information associated with information included in an anchor DCI; and transmitting or receiving the communication based at least in part on transmitting the DCI.

In some aspects, a UE for wireless communication includes a memory and one or more processors, coupled to the memory, configured to: receive DCI that schedules a communication, wherein the DCI indicates information for one or more parameters of the communication using differential information associated with information included in an anchor DCI; and transmit or receive the communication based at least in part on receiving the DCI.

In some aspects, a base station for wireless communication includes a memory and one or more processors, coupled to the memory, configured to: transmit, to a UE, DCI that schedules a communication, wherein the DCI indicates information for one or more parameters of the communication using differential information associated with information included in an anchor DCI; and transmit or receive the communication based at least in part on transmitting the DCI.

In some aspects, a non-transitory computer-readable medium storing a set of instructions for wireless communication includes one or more instructions that, when executed by one or more processors of a UE, cause the UE to: receive DCI that schedules a communication, wherein the DCI indicates information for one or more parameters of the communication using differential information associated with information included in an anchor DCI; and transmit or receive the communication based at least in part on receiving the DCI.

In some aspects, a non-transitory computer-readable medium storing a set of instructions for wireless communication includes one or more instructions that, when executed by one or more processors of a base station, cause the base station to: transmit, to a UE, DCI that schedules a communication, wherein the DCI indicates information for one or more parameters of the communication using differential information associated with information included in an anchor DCI; and transmit or receive the communication based at least in part on transmitting the DCI.

In some aspects, an apparatus for wireless communication includes means for receiving DCI that schedules a communication, wherein the DCI indicates information for one or more parameters of the communication using differential information associated with information included in an anchor DCI; and means for transmitting or means for receiving the communication based at least in part on receiving the DCI.

In some aspects, an apparatus for wireless communication includes means for transmitting, to a UE, DCI that schedules a communication, wherein the DCI indicates information for one or more parameters of the communication using differential information associated with information included in an anchor DCI; and means for transmitting or means for receiving the communication based at least in part on transmitting the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example associated with a DCI format for scheduling communications using differential information, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
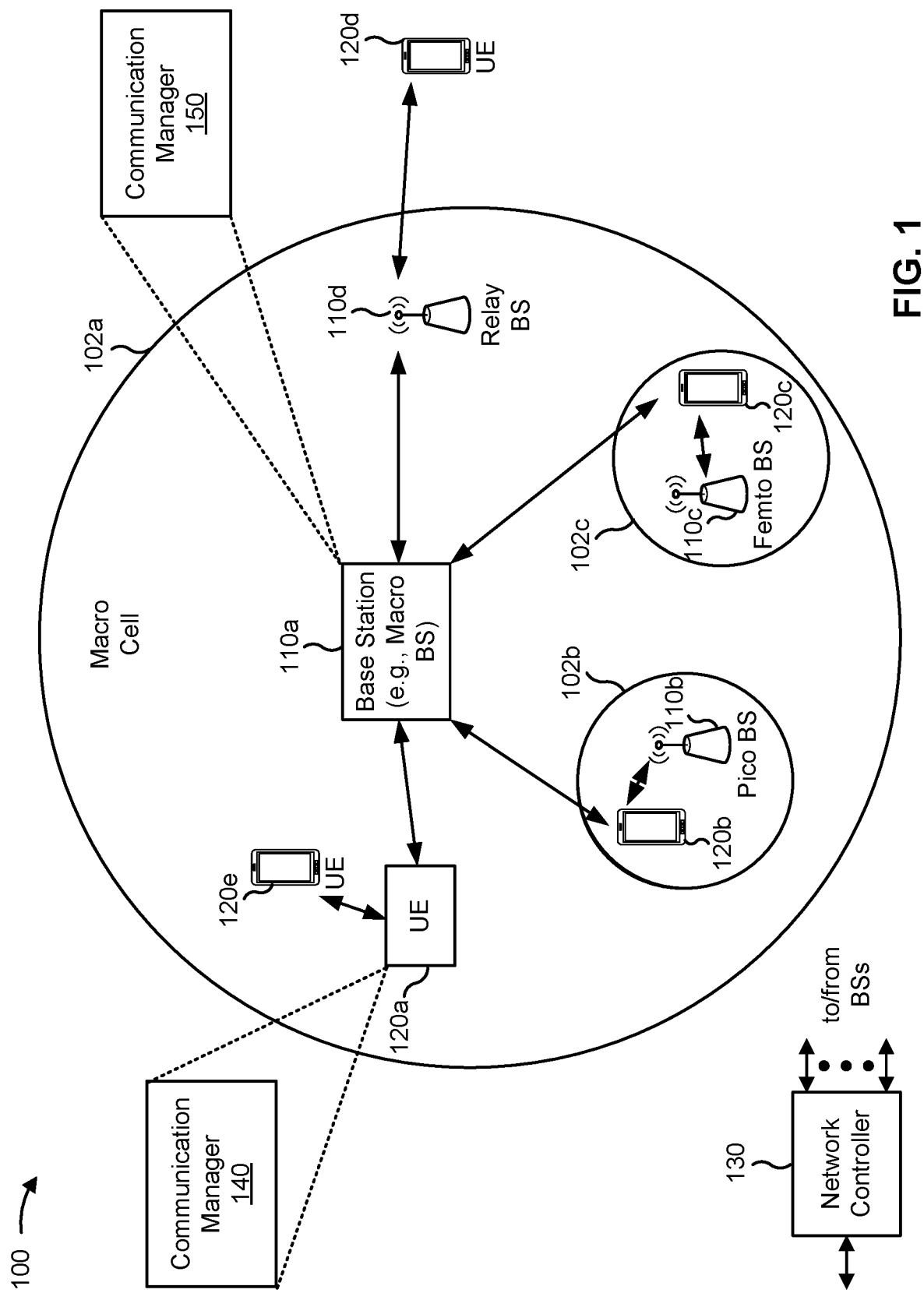
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive downlink control information (DCI) that schedules a communication, wherein the DCI indicates information for one or more parameters of the communication using differential information associated with information included in an anchor DCI; and transmit or receive the communication based at least in part on receiving the DCI. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, DCI that schedules a communication, wherein the DCI indicates information for one or more parameters of the communication using differential information associated with information included in an anchor DCI; and transmit or receive the communication based at least in part on transmitting the DCI. Additionally, or alternatively, the communication manager 150 may perform one or more other operations described herein.

As indicated above, FIG. 1 is provided as an example. Other examples may differ from what is described with regard to FIG. 1.

Figure 2:
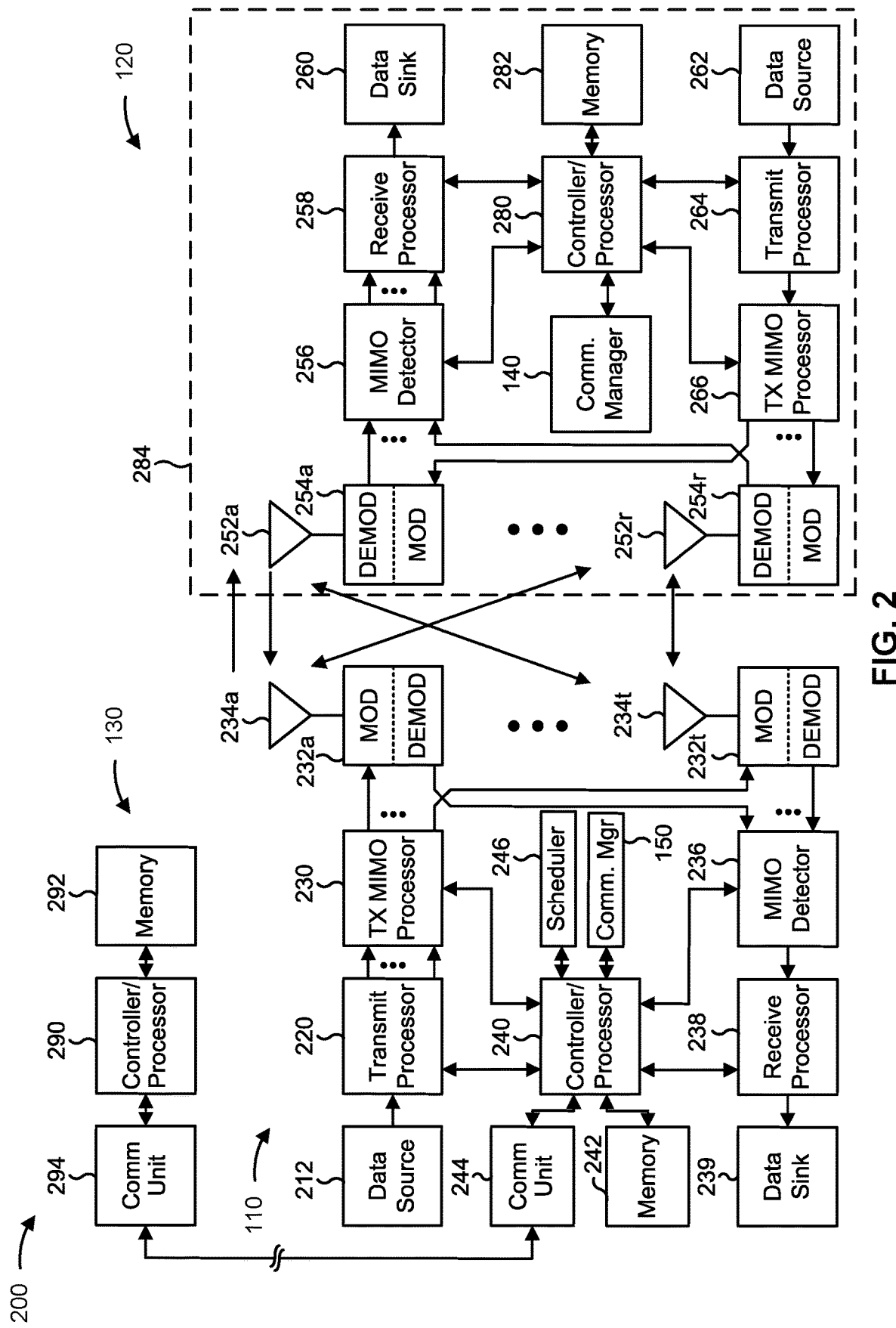
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of base station 110, controller/processor 280 of UE 120, and/or any other component(s) of FIG. 2 may perform one or more techniques associated with DCI for scheduling communications using differential information, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE 120 includes means for receiving DCI that schedules a communication, wherein the DCI indicates information for one or more parameters of the communication using differential information associated with information included in an anchor DCI; and/or means for transmitting or means for receiving the communication based at least in part on receiving the DCI. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, DCI that schedules a communication, wherein the DCI indicates information for one or more parameters of the communication using differential information associated with information included in an anchor DCI; and/or means for transmitting or means for receiving the communication based at least in part on transmitting the DCI. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
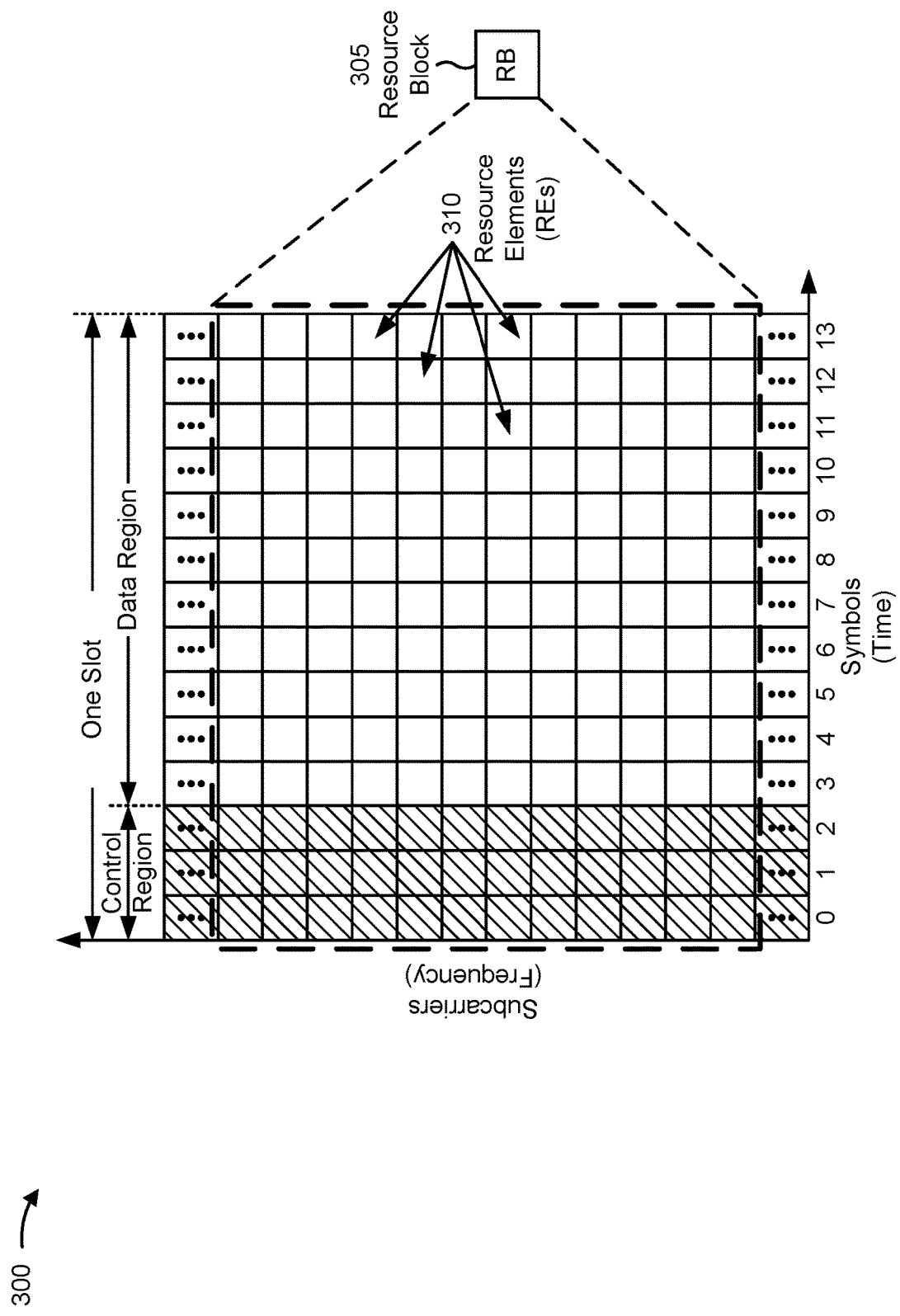
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As shown in FIG. 3, a slot may include a control region and a data region. The control region may be used for transmitting or receiving control communications (e.g., control channel communications, such as physical uplink control channel (PUCCH) communications or physical downlink control channel (PDCCH) communications). The data region may be used for transmitting or receiving data communications (e.g., shared channel communications, such as physical uplink shared channel (PUSCH) communications or physical downlink shared channel (PDSCH) communications). For example, DCI may be transmitted in the control region of a slot to schedule one or more communications. The control region may include one or more (e.g., three, as shown in FIG. 3) symbols located at the beginning of the slot.

As indicated above, FIG. 3 is provided as an example. Other examples may differ from what is described with respect to FIG. 3.

DCI may be used to schedule communications in a wireless network. For example, a base station may transmit, to a UE, DCI to schedule communications (e.g., downlink communications or uplink communications). A DCI message may indicate one or more parameters for a communication. For example, the DCI message may indicate a carrier, a bandwidth part, a frequency domain resource allocation, a time domain resource allocation, a virtual resource block (VRB)-to-PRB mapping, a PRB bundling size, an MCS, a redundancy version, a hybrid automatic repeat request (HARD) process information, a resource indicator, antenna ports, power control commands, and/or a transmission configuration indicator (TCI) state, among other examples. The base station and the UE may use the parameters indicated by the DCI to transmit and/or receive the communication.

DCI may be transmitted on the PDCCH (e.g., in a control region of a slot). In some examples, a DCI may use a DCI format. For example, DCI formats may include a DCI format 0_0, DCI format 0_1, DCI format 0_2, DCI format 1_0, DCI format 1_1, DCI format 1_2, DCI format 2_0, DCI format 2_1, DCI format 2_2, DCI format 2_3, DCI format 2_4, DCI format 2_5, DCI format 2_6, DCI format 3_0, and/or DCI format 3_1, among other examples. Different DCI formats may be associated with different usages and/or may include fields corresponding to different parameters. Some DCI formats may have the same size (e.g., the same number of bits) and some DCI formats may have different sizes. The DCI formats (e.g., the content and/or the usages associated with the DCI formats) may be defined, or otherwise fixed, by a wireless communication standard, such as the 3GPP.

However, a significant signaling overhead exists associated with transmitting DCI on PDCCH resources (e.g., in a control region of a slot). For example, for each communication scheduled by DCI, a DCI message may be transmitted that includes all parameters associated with the scheduled communication. As a number of beams used to transmit and/or receive communications and/or a number of UEs in the wireless network increases, the signaling overhead associated with DCI may also increase. For example, at higher frequency bands (e.g., FR2 and/or higher frequency bands, such as high band 5G frequency bands or 6G frequency bands) a larger number of beams may be used (e.g., by base stations and/or UEs) and/or a larger number of UEs may be included in a wireless network. As a result, signaling overhead associated with communicating DCI may significantly increase as DCI may be needed to schedule communications using the larger number of beams and/or to schedule communications for the larger number of UEs. An increase in the PDCCH resources used (e.g., for DCI) may result in a decrease in available data resources (e.g., PUSCH resources and/or PDSCH resources) for base stations and/or UEs. This may reduce a communication performance of base stations and UEs communicating in the wireless network.

Some techniques and apparatuses described herein enable DCI for scheduling communications using differential information. For example, a base station may transmit a first DCI using full information (e.g., using a DCI format, as described elsewhere herein). The base station may determine that one or more parameters for communications have not changed or have only changed a small amount (e.g., within a threshold). Therefore, the base station 110 may transmit a second DCI using differential information which utilizes information transmitted in the first DCI for indicating parameters for a communication to be scheduled by the second DCI. For example, "differential information" may refer to information that is reused from the first DCI (e.g., a value for a parameter from the first DCI is reused for the second DCI, and therefore does not need to be indicated in the second DCI) and/or may refer to information that is modified from information included in the first DCI (e.g., the second DCI may indicate a modification to a value indicated by the first DCI, which may use a smaller size than if the full value were to be indicated). For example, differential information may be associated with information (or may be based at least in part on information) included in another DCI message.

For example, channel conditions and/or environment conditions may change minimally between DCI messages transmitted by a base station. Therefore, a base station may utilize differential information to reduce a size of DCI transmitted by the base station when the channel conditions and/or environment conditions have not significantly changed from a previously transmitted DCI. In some aspects, one or more DCI formats may be defined that use differential information. For example, if the base station determines that values of one or more parameters for a communication are the same as (or are within a threshold amount of) values indicated in a previous DCI, the base station may select a DCI format that uses differential information to schedule the communication. In some aspects, the base station may use the DCI format that uses differential information regardless of whether feedback information (e.g., acknowledgement (ACK) feedback or negative ACK (NACK) feedback) is received for the previous DCI. In some other aspects, the base station may use the DCI format that uses differential information only after receiving feedback information indicating that the previous DCI was successfully received and decoded by the UE (e.g., only after receiving ACK feedback associated with the previous DCI).

As a result, a signaling overhead associated with transmitting DCI may be significantly reduced. For example, the base station may be enabled to reduce an amount of information included in the DCI (e.g., may be enabled to reduce a number of bits needed for the DCI or a payload size of the DCI) by using differential information. Reducing the signaling overhead associated with transmitting DCI may increase a scheduling flexibility for the base station. Additionally, reducing the signaling overhead associated with transmitting DCI may increase available resources for data communications.

Figure 4:
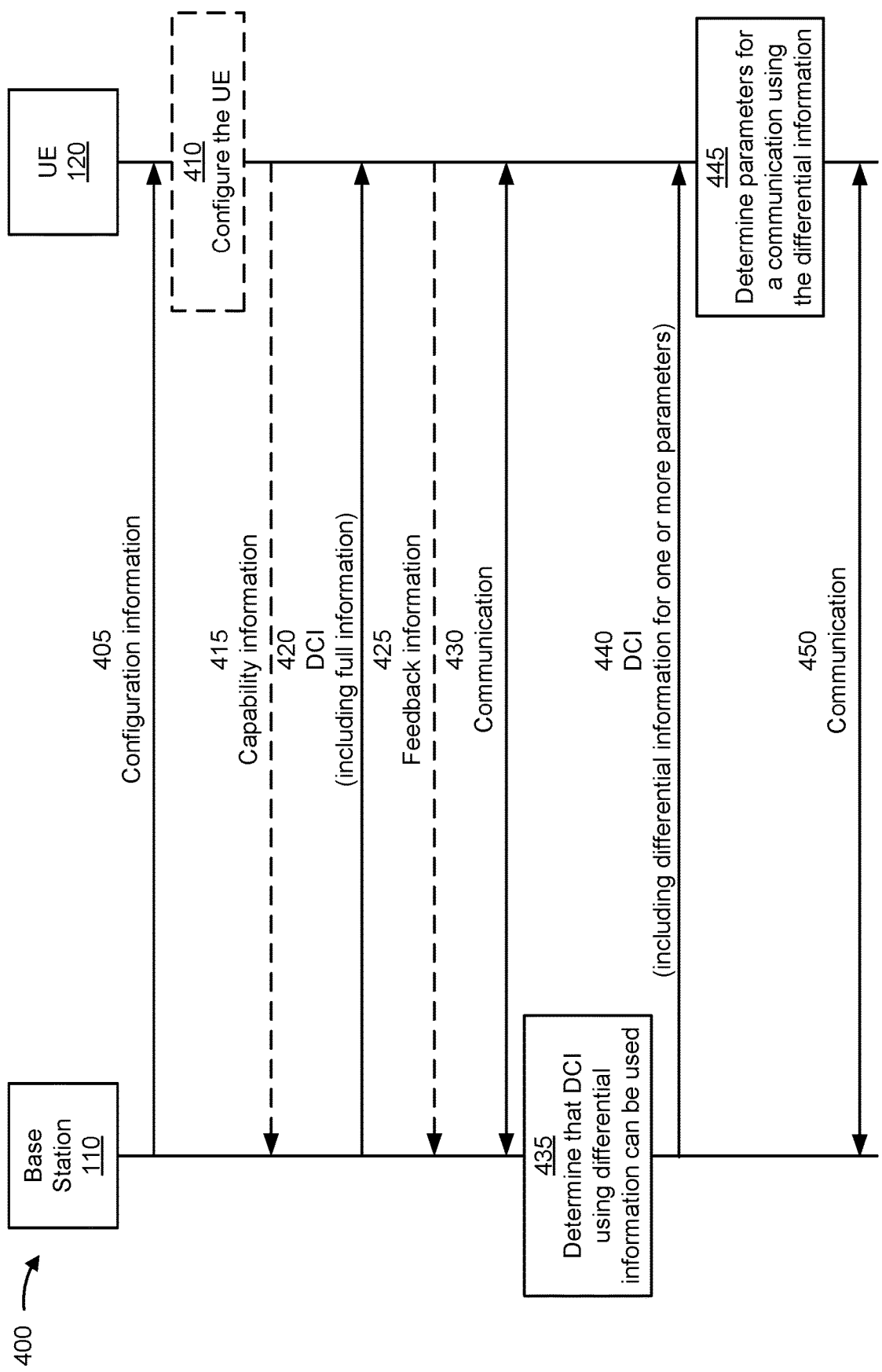
FIG. 4 is a diagram illustrating an example associated with downlink control information (DCI) for scheduling communications using differential information, in accordance with the present disclosure.

FIG. 4 is a diagram illustrating an example 400 associated with DCI for scheduling communications using differential information, in accordance with the present disclosure. As shown in FIG. 4, a base station 110 and a UE 120 may communicate with one another in a wireless network, such as the wireless network 100. As shown in FIG. 4, the base station 110 may use DCI that uses differential information (and a reduced payload size) for scheduling communications (e.g., uplink communications or downlink communications) for the UE 120.

As shown by reference number 405, the base station 110 may transmit, and the UE 120 may receive, configuration information. In some aspects, the UE 120 may receive the configuration information via one or more of radio resource control (RRC) signaling, medium access control (MAC) control element (MAC-CE) signaling, and/or DCI signaling, among other examples. In some aspects, the configuration information may include an indication of one or more configuration parameters (e.g., already known to the UE 120) for selection by the UE 120, and/or explicit configuration information for the UE 120 to use to configure the UE 120, among other examples.

In some aspects, the configuration information may indicate that the UE 120 is to transmit an indication of UE capability (e.g., UE support) to receive DCI that uses differential information. For example, the configuration information may indicate that the UE 120 is to transmit an indication of a UE capability to support one or more DCI formats that use differential information. In some aspects, the configuration information may indicate that the UE 120 is to receive DCI, for scheduling a communication, that uses differential information associated with (e.g., indicated by) a previous DCI. In some aspects, the configuration information may indicate that the UE 120 is to transmit (e.g., for an uplink communication) or receive (e.g., for a downlink communication) the communication using parameter(s) indicated by the differential information.

In some aspects, the configuration information may indicate that, when the DCI that uses differential information does not include a field associated with a parameter, the UE 120 is to reuse a value for the parameter that is indicated by the previous DCI. In some aspects, the configuration information may indicate that, when the DCI that uses differential information indicates a modification for a value of a parameter relative to the value of the parameter that is indicated by the previous DCI, the UE 120 is to modify the value indicated by the previous DCI and use the modified value for the parameter for transmitting or receiving the communication.

In some aspects, the configuration information may indicate that the UE 120 is to transmit feedback information associated with a previous DCI (e.g., a DCI that includes full information) to enable the base station 110 to use a DCI format that uses differential information. In some aspects, the configuration information may indicate that the UE 120 does not need to transmit feedback information for the previous DCI to enable the base station 110 to use a DCI format that uses differential information.

As shown by reference number 410, the UE 120 may configure the UE 120 based at least in part on the configuration information. In some aspects, the UE 120 may be configured to perform one or more operations described herein based at least in part on the configuration information.

In some aspects, as shown by reference number 415, the UE 120 may transmit, and the base station 110 may receive, capability information associated with the UE 120. For example, the capability information may indicate whether the UE 120 supports (e.g., is capable of receiving and/or decoding) DCI that uses differential information. For example, the capability information may include an indication that the UE supports or does not support one or more DCI formats associated with using differential information (e.g., one or more DCI formats that use differential information).

The base station 110 may determine whether to schedule communications for the UE 120 using DCI that includes differential information based at least in part on the capability information. For example, if the capability information indicates that the UE 120 does not support (e.g., is not capable of receiving and/or decoding) DCI that uses differential information, then the base station 110 may refrain from transmitting DCI, to the UE 120, that uses differential information. If the capability information indicates that the UE 120 does support (e.g., is capable of receiving and/or decoding) DCI that uses differential information, then the base station 110 may transmit DCI, to the UE 120, that uses differential information (e.g., as described in more detail elsewhere herein).

As shown by reference number 420, the base station 110 may transmit, and the UE 120 may receive, DCI scheduling a communication (e.g., an uplink communication or a downlink communication). The DCI may include full information. "Full information" may refer to information included in DCI that indicates values for a set of parameters (e.g., and does not use any differential information). For example, DCI that includes full information may use DCI format 0_0, DCI format 0_1, DCI format 0_2, DCI format 1_0, DCI format 1_1, DCI format 1_2, DCI format 2_0, DCI format 2_1, DCI format 2_2, DCI format 2_3, DCI format 2_4, DCI format 2_5, DCI format 2_6, DCI format 3_0, a DCI format 3_1, and/or another DCI format defined, or otherwise fixed, by a wireless communication standard.

DCI that is used as a reference by DCI that includes differential information may be referred to as "anchor DCI." For example, an anchor DCI may be a DCI that indicates full information for parameters of a communication. In some aspects, an anchor DCI may be a DCI that includes full information. In some aspects, an anchor DCI may be a DCI that includes full information for a first one or more parameters and differential information for a second one or more parameters, where the DCI is used as a reference for another DCI that uses differential information relative to (or reusing) the full information for the first one or more parameters. For example, an anchor DCI may be a last received DCI that includes full information (e.g., an actual value or information) for a parameter for which a later DCI uses differential information. In some aspects, which DCI message is to serve as an anchor DCI may be indicated to the UE 120. For example, the base station 110 may indicate that a DCI transmitted by the base station 110 is to serve as an anchor DCI for one or more future DCI messages that use differential information. In some aspects, the UE 120 may determine which DCI message is to serve as an anchor DCI based at least in part on determining a most recently received DCI that includes full information for a parameter that is indicated using differential information in a later DCI.

In some aspects, as shown by reference number 425, the UE 120 may transmit, and the base station 110 may receive, feedback information for the DCI (e.g., with the anchor DCI). For example, the UE 120 may transmit feedback information that indicates whether the UE 120 has successfully received and/or decoded the anchor DCI (e.g., ACK feedback or NACK feedback). In some aspects, the UE 120 may transmit the feedback information based at least in part on an indication received from the base station 110. For example, the base station 110 may transmit, to the UE 120, an indication to transmit feedback information for the anchor DCI (and/or for all DCI that include full information).

In some aspects, the indication to transmit feedback information for the anchor DCI (and/or for all DCI that include full information) may be included in the anchor DCI. In some other aspects, the indication to transmit feedback information for the anchor DCI (and/or for all DCI that include full information) may be included in the configuration information. In some other aspects, the indication to transmit feedback information for the anchor DCI (and/or for all DCI that include full information) may be included in another message, such as an RRC message, a MAC-CE message, or a DCI message. The base station 110 may use the feedback information to determine whether DCI that includes differential information (e.g., relative to information included in the anchor DCI) can be used, as described in more detail elsewhere herein.

As shown by reference number 430, the base station 110 and the UE 120 may communicate (e.g., transmit and/or receive) a message scheduled by the DCI (e.g., by the anchor DCI and/or the DCI that includes full information). For example, if the message is an uplink message, the UE 120 may transmit, and the base station 110 may receive, the message using one or more parameters and/or resources indicated by the DCI. If the message is a downlink message, the base station 110 may transmit, and the UE 120 may receive, the message using one or more parameters and/or resources indicated by the DCI.

As shown by reference number 435, the base station 110 may determine that DCI using differential information can be used by the base station 110. For example, the base station 110 may determine that the UE 120 supports a DCI format that uses differential information (e.g., based at least in part on the capability information reported by the UE 120). In some aspects, the base station 110 may determine that DCI using differential information can be used based at least in part on determining that a value for a parameter has not changed from a value indicated by the previous DCI (e.g., by the anchor DCI). For example, the base station 110 may determine that an allocation rank for a communication, a bandwidth (e.g., a bandwidth part) for the communication, a frequency domain resource allocation for the communication, a time domain resource allocation for the communication, and/or antenna port(s) to be used for the communication, among other examples, are to be the same values or information as used for a previous communication (e.g., scheduling by the anchor DCI). In other words, the base station 110 may determine that information or values for one or more parameters to be included in the DCI would be repeated from the previous DCI (e.g., the anchor DCI) if the information or values were to be included in the DCI. Therefore, the base station 110 may select a DCI format that uses differential information for the DCI to reduce a signaling overhead associated with the DCI.

In some aspects, the base station 110 may determine that DCI using differential information can be used based at least in part on determining that a change in a value for a parameter from the value for the parameter indicated in the previous DCI (e.g., in the anchor DCI) is less than or equal to a threshold. For example, the base station 110 may determine that a value for a parameter to be indicated in the DCI is within the threshold amount of a value of the parameter indicated in the previous DCI (e.g., in the anchor DCI). This may enable the base station 110 to use differential information in the DCI to indicate a modification to the value, rather than the full value, to reduce a size of the DCI. For example, an indication of a MCS may use a size of 5 bits. However, if a change of an index value of the MCS (e.g., from an index value of an MCS indicated by the previous DCI and/or the anchor DCI) is within a threshold amount, the base station 110 may be enabled to use a fewer number of bits (e.g., 2 bits or 3 bits) to indicate the modification of the index value, rather than the full index value. For example, to indicate a full range of indices for possible MCSs, 5 bits may be needed. However, 2 bits may be used to indicate that an index of the MCS is to be decreased by 2 (e.g., a value of "00"), to be decreased by 1 (e.g., a value of "00"), to remain the same (e.g., a value of "10"), or to be increased by 1 (e.g., a value of "11"). Therefore, a fewer number of bits may be used by the base station 110 to indicate the MCS (e.g., by using differential information) than if the index value of the MCS were to be indicated by the base station 110. The base station 110 may indicate modifications for values of other parameters indicated by the DCI in a similar manner as described above.

For example, the base station 110 may determine that channel conditions measured and/or detected by the base station 110 have not changed (or that an amount of change of a channel condition is less than or equal to a threshold amount) from channel conditions that were present at the time that the anchor DCI was transmitted. Therefore, the base station 110 may determine that parameters for an upcoming communication are to be approximately the same as parameters used for a previous communication (e.g., that was scheduled by the anchor DCI). In other words, the base station 110 may select a DCI format that uses differential information when scheduling information (e.g., one or more parameters for a communication) to be indicated in DCI remains the same or only slightly changed from previously transmitted scheduling information (e.g., in a previous DCI or an anchor DCI). As a result, the base station 110 may select a DCI format that uses differential information to reduce a size of the DCI to be transmitted by the base station 110.

In some aspects, the base station 110 may select a DCI format that uses differential information based at least in part on the one or more parameters that are to be indicated using differential information. For example, a set of DCI formats may be defined (e.g., by the base station 110 or by a wireless communication standard, such as the 3GPP) that use differential information. In some aspects, the set of DCI formats may include different parameters and may enable the base station 110 to use differential information for different parameters. For example, a first DCI format may not include fields for a first one or more parameters (e.g., indicating that information for the one or more parameters is to be reused from an anchor DCI) and/or may include fields for a second one or more parameters that indicate that a modification is to be indicated (e.g., rather than an actual value). A second DCI format may not include fields for a third one or more parameters (e.g., indicating that information for the one or more parameters is to be reused from an anchor DCI) and/or may include fields for a fourth one or more parameters that indicate that a modification is to be indicated (e.g., rather than an actual value).

Therefore, the base station 110 may select a DCI format that uses differential information based at least in part on the parameter(s) that are to be indicated using differential information (e.g., the base station 110 may select the DCI format that enables the base station 110 to use differential information to indicate the parameter(s)). For example, if the base station 110 determines that a frequency domain resource allocation or assignment for a communication is to remain the same as a frequency domain resource allocation or assignment for a previous communication (e.g., indicated by an anchor DCI), then the base station 110 may select a DCI format that enables the base station 110 to indicate the frequency domain resource allocation or assignment using differential information (e.g., a DCI format that omits or does not include a field associated with frequency domain resource allocations or assignments).

In some aspects, the base station 110 may select a DCI format that uses differential information based at least in part on a format of the DCI to be transmitted. For example, one or more reduced DCI formats (e.g., DCI formats that use differential information) may be defined (e.g., by the base station 110 or by a wireless communication standard) for full DCI formats (e.g., DCI formats that do not use differential information). For example, one or more reduced DCI formats may be defined for a DCI format 0_0, one or more reduced DCI formats may be defined for a DCI format 0_1, one or more reduced DCI formats may be defined for a DCI format 0_2, one or more reduced DCI formats may be defined for a DCI format 1_0, and so on. Therefore, if the base station 110 determines that a particular DCI format (e.g., DCI format 0_1) is to be used to schedule a communication, then the base station 110 may select a reduced DCI format associated with the particular DCI format (e.g., DCI format 0_1).

In some aspects, the base station 110 may select information to be included in the DCI based at least in part on the one or more parameters that are to be indicated using differential information. For example, if the base station 110 determines that a bandwidth part to be used for an upcoming communication is to remain the same as a bandwidth part used by a previous communication (e.g., indicated by an anchor DCI), then the base station 110 may determine that a field or information associated with indicating the bandwidth part is to not be included in the DCI that uses differential information. As another example, if the base station 110 determines that an index for an MCS for an upcoming communication is to be increased by a value of 1 from an index for an MCS used by a previous communication (e.g., indicated by an anchor DCI or another DCI that used differential information), then the base station 110 may determine that a modification value (e.g., indicating that the index for the MCS is to be increased by a value of 1, rather than indicating that actual index value) is to be included in the DCI that uses differential information.

As shown by reference number 440, the base station 110 may transmit, and the UE 120 may receive, DCI that schedules a communication (e.g., an uplink communication or a downlink communication). The DCI may use differential information to indicate values for one or more parameters of the communication. The DCI may use a DCI format that is associated with using differential information. In some aspects, the DCI may not include a field associated with one or more parameters for the communication (e.g., and therefore may not indicate information associated with the one or more parameters). In some aspects, the DCI may indicate a modification for a value of a parameter of the communication relative to the value of the parameter that is indicated by the previous DCI (e.g., by an anchor DCI, or another DCI that used differential information, that scheduled a different communication). For example, the DCI may indicate values of information for one or more parameters using differential information. As described elsewhere herein, the differential information may indicate that information indicated by the previous DCI (e.g., by an anchor DCI) is to be reused or may indicate a modification of information indicated by the previous DCI (e.g., by the anchor DCI).

As shown by reference number 445, the UE 120 may determine information or values for parameters of the communication using information indicated by the DCI. For example, the UE 120 may determine information or values for one or more parameters of the communication using differential information indicated by the DCI. In some aspects, when the DCI omits or does not include a field (or information) for a parameter, the UE 120 may determine that a value or information for the parameter is to be reused from an anchor DCI. For example, if the DCI omits or does not include a field (or information) for a time domain resource allocation (e.g., for indicating an index value of a time domain resource allocation table), then the UE 120 may determine that information for the time domain resource allocation (e.g., the index value of a time domain resource allocation table) is to be reused from the information indicated by the anchor DCI. For example, the UE 120 may determine a most recently received DCI that indicated a value of the parameter that was omitted in the DCI (e.g., may determine the anchor DCI). The UE 120 may determine, based at least in part on the DCI omitting a field or value for the parameter, that the value of the parameter that was indicated in the most recently received DCI that indicated the value of the parameter (e.g., the value indicated by the anchor DCI) is to be reused for the communication that is scheduled by the DCI that omits or does not include a field (or information) for the parameter.

In some aspects, if the DCI indicates a modification for a value of a parameter relative to the value of the parameter that is indicated by the previous DCI (e.g., by an anchor DCI or another DCI), then the UE 120 may determine information or a value for the parameter based at least in part on modifying the information or the value indicated by the previous DCI. In some aspects, the modification for the value of the parameter may be relative to a most recently received DCI that includes full information (e.g., an actual value) for the parameter. For example, a first DCI may indicate that an index for an MCS for a first communication is 24 (e.g., using full information and/or by indicating the index value of "24"). A second DCI may indicate that the index value is to be increased by 1 (e.g., using differential information, resulting in an index value of 25 (e.g., 24+1=25) for a communication scheduled by the second DCI). A third DCI may indicate that the index value is to be decreased by 2 (e.g., using differential information, resulting in an index value of 22 (e.g., 24−2=22) for a communication scheduled by the third DCI). In other words, DCI that indicates a modification of a value of a parameter may modify the value relative to the last received value of the parameter in full information (e.g., regardless of modifications made by other DCI messages that use differential information).

In some aspects, the modification for the value of the parameter may be relative to a last value of the parameter as determined by the UE 120 based at least in part on differential information indicated in the previous DCI (e.g., the most recently received DCI). For example, a first DCI may indicate that an index for an MCS for a first communication is 24 (e.g., using full information and/or by indicating the index value of "24"). A second DCI may indicate that the index value is to be increased by 1 (e.g., using differential information, resulting in an index value of 25 (e.g., 24+1=25) for a communication scheduled by the second DCI). A third DCI may indicate that the index value is to be decreased by 2 (e.g., using differential information, resulting in an index value of 23 (e.g., 25−2=23) for a communication scheduled by the third DCI). In other words, DCI that indicates a modification of a value of a parameter may modify the value relative to the last received and/or determined value of the parameter (e.g., which may be indicated by an actual value of the parameter or may be indicated using differential information).

Therefore, the UE 120 may be enabled to determine values or information for parameters of a communication when the DCI that schedules the communication uses differential information. For example, the UE 120 may determine that information from a previously received DCI is to be reused for the communication. Additionally, or alternatively, the UE 120 may determine that information from a previously received DCI is to be modified (e.g., based at least in part on a modification indicated by the DCI that schedules the communication). Moreover, the DCI that schedules the communication using differential information may indicate full information (e.g., actual values or information) for one or more parameters of the communication.

As shown by reference number 450, the base station 110 and the UE 120 may transmit and/or receive a communication scheduled by the DCI that uses differential information. For example, if the communication is an uplink communication (e.g., a PUSCH communication), then the UE 120 may transmit, and the base station 110 may receive, the communication using one or more parameters and/or resources indicated by the DCI. If the communication is a downlink communication (e.g., a PDSCH communication), then the base station 110 may transmit, and the UE 120 may receive, the communication using one or more parameters and/or resources indicated by the DCI. For example, the communication may use a value for a parameter that is reused from (e.g., indicated by) an anchor DCI. As another example, the communication may use a value for a parameter that is modified from a value indicated by a previous DCI (e.g., an anchor DCI and/or a previously received DCI that uses differential information).

As a result, a signaling overhead associated with transmitting DCI may be significantly reduced. For example, the base station 110 may be enabled to reduce an amount of information included in the DCI (e.g., may be enabled to reduce a number of bits needed for the DCI or a payload size of the DCI) by using differential information. Reducing the signaling overhead associated with transmitting DCI may increase a scheduling flexibility for the base station 110. Additionally, reducing the signaling overhead associated with transmitting DCI may increase available resources for data communications, thereby improving communication performance of the UE 120 and the base station 110 (e.g., by enabling the UE 120 and/or the base station 110 to communicate more data).

As indicated above, FIG. 4 is provided as an example. Other examples may differ from what is described with respect to FIG. 4.

FIG. 5 is a diagram illustrating an example 500 associated with a DCI format for scheduling communications using differential information, in accordance with the present disclosure. As shown in FIG. 5, a table is shown depicting parameters that may be indicated in a DCI that uses a DCI format 1_1. For example, the table indicates different fields (for different parameters) and a number of bits (e.g., a size) that is associated with each field. As shown in FIG. 5, DCI that uses differential information may enable one or more fields to be omitted and/or may enable a size of one or more fields to be decreased.

For example, as shown by reference number 505, information for one or more parameters may be potentially removed or omitted for DCI that uses differential information. For example, information or values for the fields indicated by reference number 505 may be reused from a previously transmitted DCI (e.g., an anchor DCI). For example, the one or more fields that may be removed or omitted in the DCI that uses differential information include a carrier indicator field, a bandwidth part indicator field, a frequency domain resource assignment or allocation field, a time domain resource assignment or allocation field, a VRB-to-PRB mapping field, a PRB bundling size indicator field, and/or a rate matching indicator field. For example, if the values for the one or more fields remain the same from values indicated by a previous DCI, then a base station 110 may be enabled to transmit a DCI that omits or removes the one or more fields, as described in more detail elsewhere herein.

As shown in FIG. 5, removing, or omitting, the one or more fields may result in a reduction of a size of the DCI to be transmitted by the base station 110. For example, removing or omitting a time domain resource assignment or allocation field may result in a size of the DCI being reduced by up to 4 bits. As another example, removing or omitting a carrier indicator field may result in a size of the DCI being reduced by up to 3 bits.

As shown by reference number 510, information for one or more parameters may be potentially reduced for DCI that uses differential information. For example, some information may be indicated using a modification value (e.g., rather than an actual value) for a parameter, which may result in a size of the indication to be reduced. For example, as shown in FIG. 5, an indication of an MCS to be used for a communication may be associated with a size of 5 bits. However, if a modification value is indicated (e.g., rather than an actual value of an MCS index), then a size of the indication of the MCS may be reduced. For example, a size of the MCS field may be reduced to 2 bits to enable the base station 110 to indicate 4 potential modification values. For example, the base station 110 may be enabled to indicate that an MCS index is to be decreased by 2 (e.g., using a value of "00"), that an MCS index is to be decreased by 1 (e.g., using a value of "01"), that an MCS index is to remain the same (e.g., using a value of "10"), or that an MCS index is to be increased by 1 (e.g., using a value of "11"). As another example, a size of the MCS field may be reduced to 3 bits to enable the base station 110 to indicate 8 potential modification values.

As shown by reference number 515, information for one or more parameters may be potentially removed or omitted for DCI that uses differential information. For example, information or values for the fields indicated by reference number 515 may be reused from a previously transmitted DCI (e.g., an anchor DCI). For example, the one or more fields that may be removed or omitted in the DCI that uses differential information include an antenna port indicator field, and/or a transmission configuration indication field. For example, if the values for the one or more fields remain the same from values indicated by a previous DCI, then a base station 110 may be enabled to transmit a DCI that omits or removes the one or more fields, as described in more detail elsewhere herein. As shown in FIG. 5, removing, or omitting, the one or more fields may result in a reduction of a size of the DCI to be transmitted by the base station 110. For example, removing or omitting an antenna port indicator field may result in a size of the DCI being reduced by up to 6 bits.

The fields and/or parameters described above are provided as examples. Other fields and/or parameters may be removed or reduced in a similar manner as described herein. Moreover, the table depicted in FIG. 5 for DCI format 1_1 is provided as an example. Information and/or fields associated with other DCI formats may be removed and/or reduced in a similar manner as described herein.

As indicated above, FIG. 5 is provided as an example. Other examples may differ from what is described with respect to FIG. 5. For example, other DCI formats may use differential information in a similar manner as described herein. Additionally, or alternatively, other fields or parameters may be indicated using differential information in a similar manner as described herein.

Figure 6:
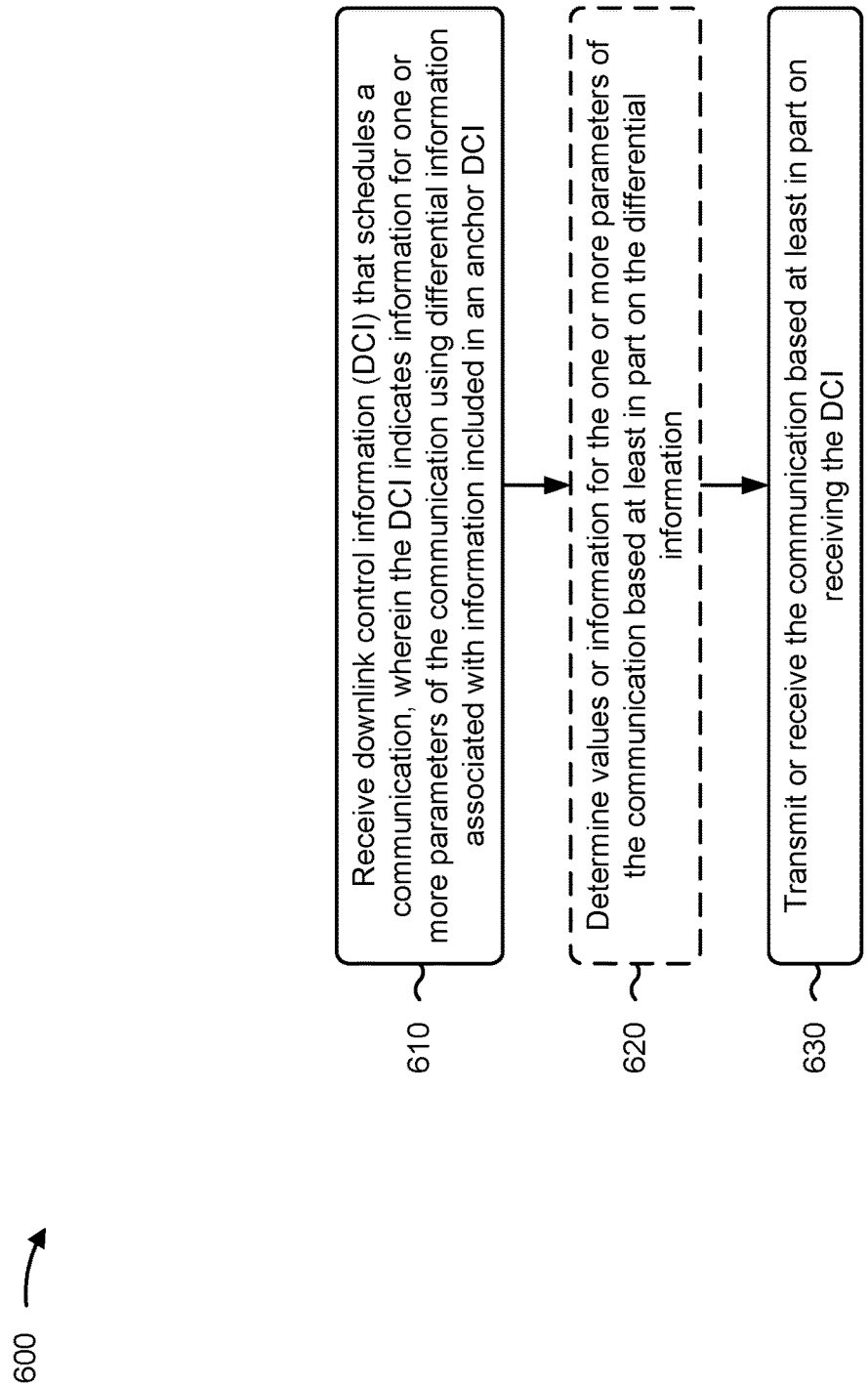
FIGS. 6 and 7 are diagrams illustrating example processes associated with DCI for scheduling communications using differential information, in accordance with the present disclosure.

FIG. 6 is a diagram illustrating an example process 600 performed, for example, by a UE, in accordance with the present disclosure. Example process 600 is an example where the UE (e.g., UE 120) performs operations associated with DCI for scheduling communications using differential information.

As shown in FIG. 6, in some aspects, process 600 may include receiving DCI that schedules a communication, wherein the DCI indicates information for one or more parameters of the communication using differential information associated with information included in an anchor DCI (block 610). For example, the UE (e.g., using communication manager 140 and/or reception component 802, depicted in FIG. 8) may receive DCI that schedules a communication, wherein the DCI indicates information for one or more parameters of the communication using differential information associated with information included in an anchor DCI, as described above.

As further shown in FIG. 6, in some aspects, process 600 may optionally include determining values or information for the one or more parameters of the communication based at least in part on the differential information (block 620). For example, the UE (e.g., using communication manager 140 and/or determination component 808, depicted in FIG. 8) may determine values or information for the one or more parameters of the communication based at least in part on the differential information, as described above.

As further shown in FIG. 6, in some aspects, process 600 may include transmitting or receiving the communication based at least in part on receiving the DCI (block 630). For example, the UE (e.g., using communication manager 140, transmission component 804, and/or reception component 802, depicted in FIG. 8) may transmit or receive the communication based at least in part on receiving the DCI, as described above.

Process 600 may include additional aspects, such as any single aspect or any combination of aspects described below and/or in connection with one or more other processes described elsewhere herein.

In a first aspect, the DCI uses a format associated with using differential information.

In a second aspect, a field associated with a parameter of the one or more parameters is not included in the DCI, and transmitting or receiving the communication includes transmitting or receiving the communication using a value for the parameter that is indicated by the anchor DCI.

In a third aspect, the DCI indicates a modification for a value of a parameter relative to the value of the parameter that is indicated to the UE, and transmitting or receiving the communication includes transmitting or receiving the communication using a modified value for the parameter based at least in part on the modification indicated by the DCI.

In a fourth aspect, process 600 includes receiving, from a base station, an indication that feedback information is to be provided for DCI that does not include differential information, receiving, from the base station, the anchor DCI, and transmitting, to the base station, feedback information associated with the anchor DCI indicating that the anchor DCI was successfully decoded, and receiving the DCI is based at least in part on transmitting the feedback information.

In a fifth aspect, the differential information indicates that information indicated by the anchor DCI is to be reused or indicates a modification of information indicated by the anchor DCI.

In a sixth aspect, process 600 includes transmitting an indication that the UE supports a DCI format associated with using differential information, and receiving the DCI is based at least in part on transmitting the indication that the UE supports the DCI format.

In a seventh aspect, the one or more parameters include at least one of a carrier indicator, a bandwidth part indicator, a frequency domain resource allocation, a time domain resource allocation, a VRB-to-PRB mapping, a PRB bundling size indicator, a rate matching indicator, a modulation and coding scheme, an antenna port indicator, or a transmission configuration indication.

In an eighth aspect, the communication is a downlink communication, and transmitting or receiving the communication includes receiving the communication based at least in part on receiving the DCI.

In a ninth aspect, the communication is an uplink communication, and transmitting or receiving the communication includes transmitting the communication based at least in part on receiving the DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
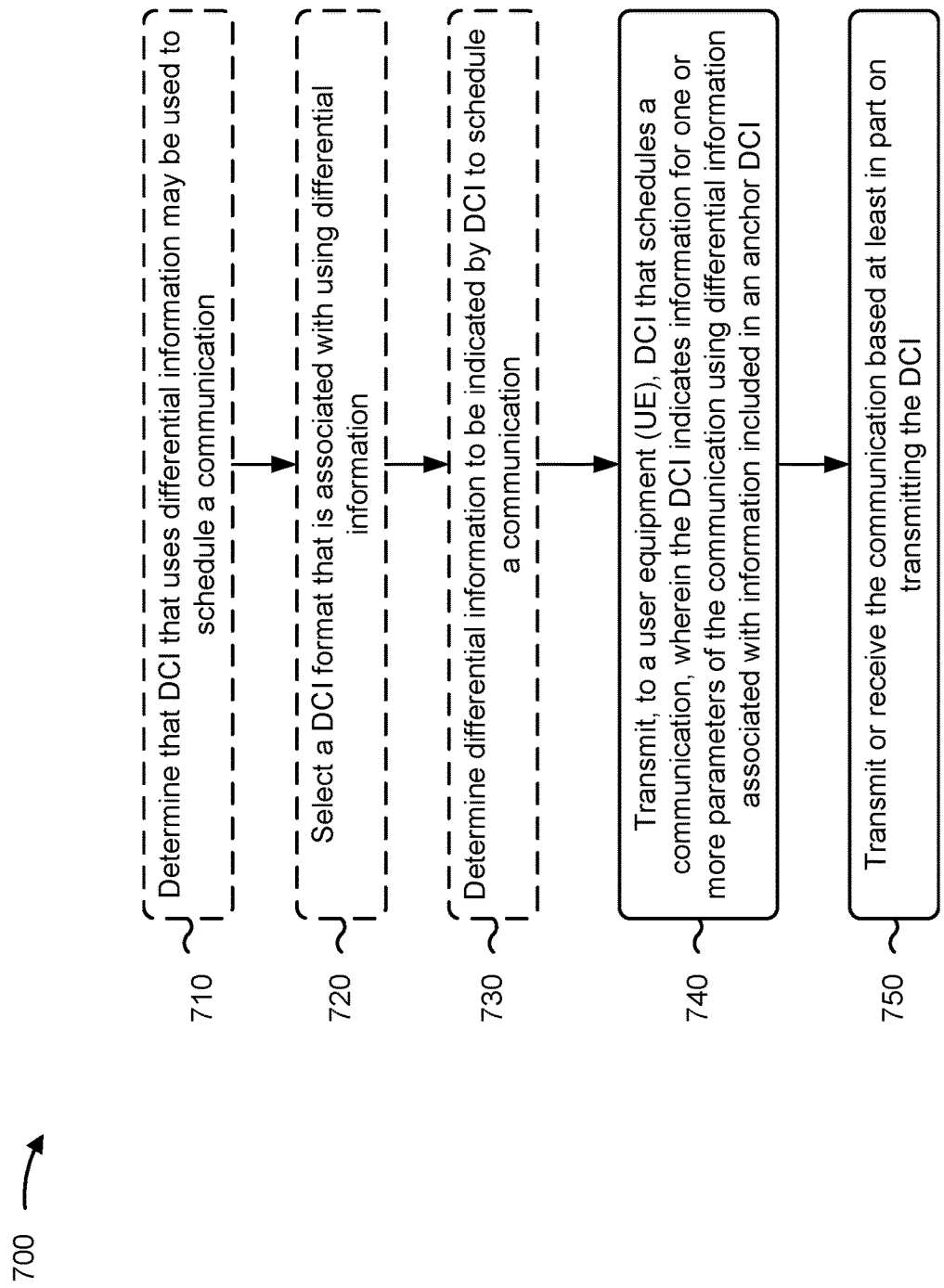

FIG. 7 is a diagram illustrating an example process 700 performed, for example, by a base station, in accordance with the present disclosure. Example process 700 is an example where the base station (e.g., base station 110) performs operations associated with DCI for scheduling communications using differential information.

As shown in FIG. 7, in some aspects, process 700 may optionally include determining that DCI that uses differential information may be used to schedule a communication (block 710). For example, the base station (e.g., using communication manager 150 and/or determination component 908, depicted in FIG. 9) may determine that DCI that uses differential information may be used to schedule a communication, as described above.

As shown in FIG. 7, in some aspects, process 700 may optionally include selecting a DCI format that is associated with using differential information (block 720). For example, the base station (e.g., using communication manager 150 and/or determination component 908, depicted in FIG. 9) may select a DCI format that is associated with using differential information, as described above.

As shown in FIG. 7, in some aspects, process 700 may optionally include determining differential information to be indicated by DCI to schedule a communication (block 730). For example, the base station (e.g., using communication manager 150 and/or determination component 908, depicted in FIG. 9) may determine differential information to be indicated by DCI to schedule a communication, as described above.

As shown in FIG. 7, in some aspects, process 700 may include transmitting, to a UE, DCI that schedules a communication, wherein the DCI indicates information for one or more parameters of the communication using differential information associated with information included in an anchor DCI (block 740). For example, the base station (e.g., using communication manager 150 and/or transmission component 904, depicted in FIG. 9) may transmit, to a UE, DCI that schedules a communication, wherein the DCI indicates information for one or more parameters of the communication using differential information associated with information included in an anchor DCI, as described above.

As further shown in FIG. 7, in some aspects, process 700 may include transmitting or receiving the communication based at least in part on transmitting the DCI (block 750). For example, the base station (e.g., using communication manager 150, transmission component 904, and/or reception component 902, depicted in FIG. 9) may transmit or receive the communication based at least in part on transmitting the DCI, as described above.

Process 700 may include additional aspects, such as any single aspect or any combination of aspects described below and/or in connection with one or more other processes described elsewhere herein.

In a first aspect, the DCI uses a format associated with using differential information.

In a second aspect, process 700 includes transmitting, to the UE, the anchor DCI indicating a first value for a parameter of the one or more parameters, and selecting a DCI format, for the DCI, that uses differential information based at least in part on a second value for the parameter, that is to be indicated in the DCI, being the same as the first value or within a threshold amount of the first value.

In a third aspect, a field associated with a parameter of the one or more parameters is not included in the DCI, and transmitting or receiving the communication includes transmitting or receiving the communication using a value for the parameter that is indicated by the anchor DCI.

In a fourth aspect, the DCI indicates a modification for a value of a parameter relative to the value of the parameter that is indicated to the UE, and transmitting or receiving the communication includes transmitting or receiving the communication using a modified value for the parameter based at least in part on the modification indicated by the DCI.

In a fifth aspect, process 700 includes transmitting, to the UE, an indication that feedback information is to be provided for DCI that does not include differential information, transmitting, to the UE, the anchor DCI, and receiving, from the UE, feedback information associated with the anchor DCI indicating that the anchor DCI was successfully decoded, and transmitting the DCI is based at least in part on receiving the feedback information.

In a sixth aspect, process 700 includes transmitting, to the UE, the anchor DCI, and transmitting the DCI includes transmitting the anchor DCI regardless of whether information associated with the anchor DCI is received by the base station.

In a seventh aspect, the differential information indicates that information indicated by the anchor DCI is to be reused or indicates a modification of information indicated by the anchor DCI.

In an eighth aspect, process 700 includes receiving an indication that the UE supports a DCI format associated with using differential information, and transmitting the DCI is based at least in part on receiving the indication that the UE supports the DCI format.

In a ninth aspect, the one or more parameters include at least one of a carrier indicator, a bandwidth part indicator, a frequency domain resource allocation, a time domain resource allocation, a VRB-to-PRB mapping, a PRB bundling size indicator, a rate matching indicator, a modulation and coding scheme, an antenna port indicator, or a transmission configuration indication.

In a tenth aspect, the communication is a downlink communication, and transmitting or receiving the communication includes transmitting the communication based at least in part on transmitting the DCI.

In an eleventh aspect, the communication is an uplink communication, and transmitting or receiving the communication includes receiving the communication based at least in part on transmitting the DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
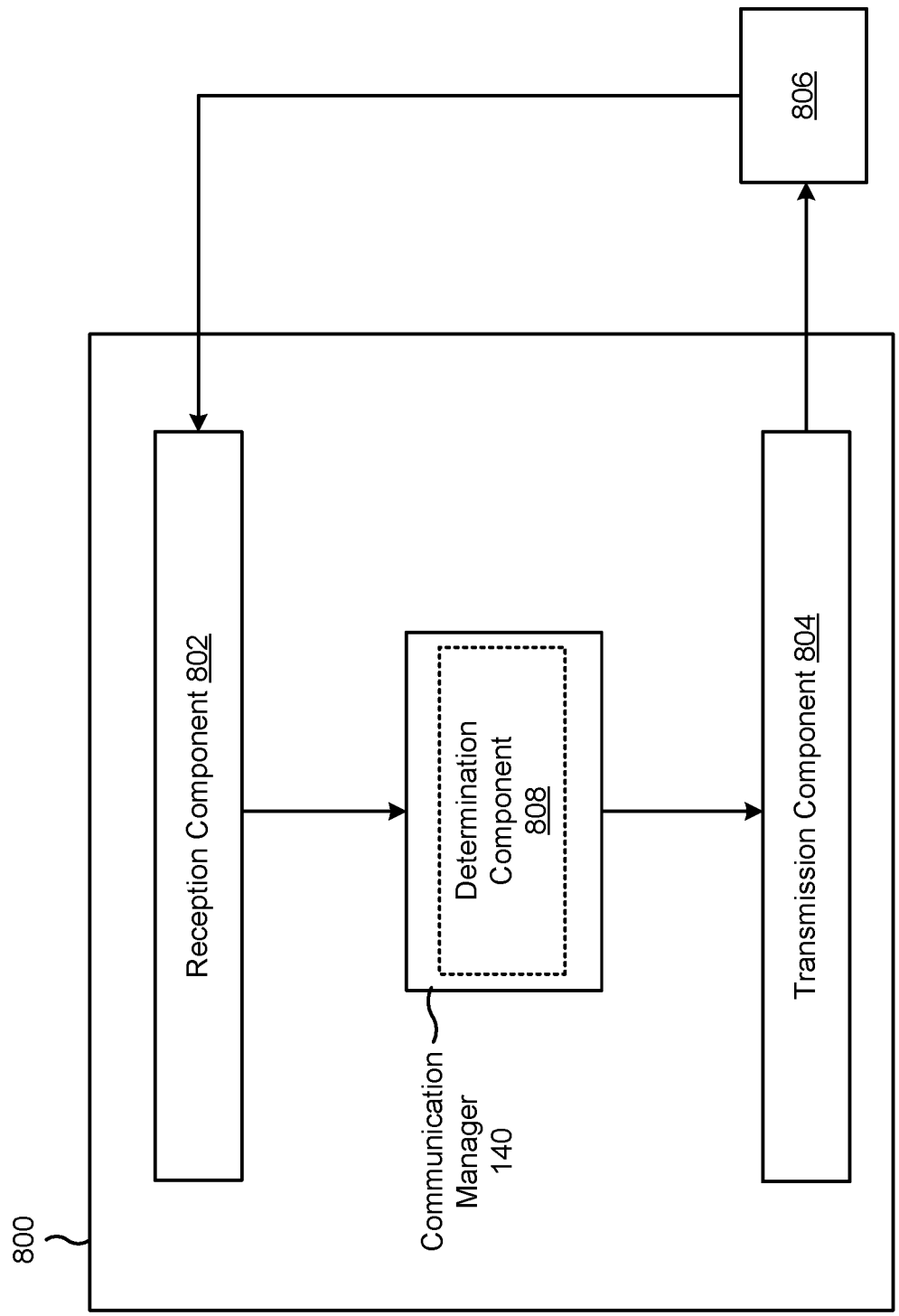
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a determination component 808, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive DCI that schedules a communication, wherein the DCI indicates information for one or more parameters of the communication using differential information associated with information included in an anchor DCI. The transmission component 804 may transmit, or the reception component 802 may receive, the communication based at least in part on receiving the DCI.

The determination component 808 may determine values or information for the one or more parameters of the communication based at least in part on the differential information (and/or information indicated by the anchor DCI).

The reception component 802 may receive, from a base station, an indication that feedback information is to be provided for DCI that does not include differential information.

The reception component 802 may receive, from the base station, the anchor DCI. The transmission component 804 may transmit, to the base station, feedback information associated with the anchor DCI indicating that the anchor DCI was successfully decoded, wherein receiving the DCI is based at least in part on transmitting the feedback information.

The transmission component 804 may transmit an indication that the UE supports a DCI format associated with using differential information, wherein receiving the DCI is based at least in part on transmitting the indication that the UE supports the DCI format.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
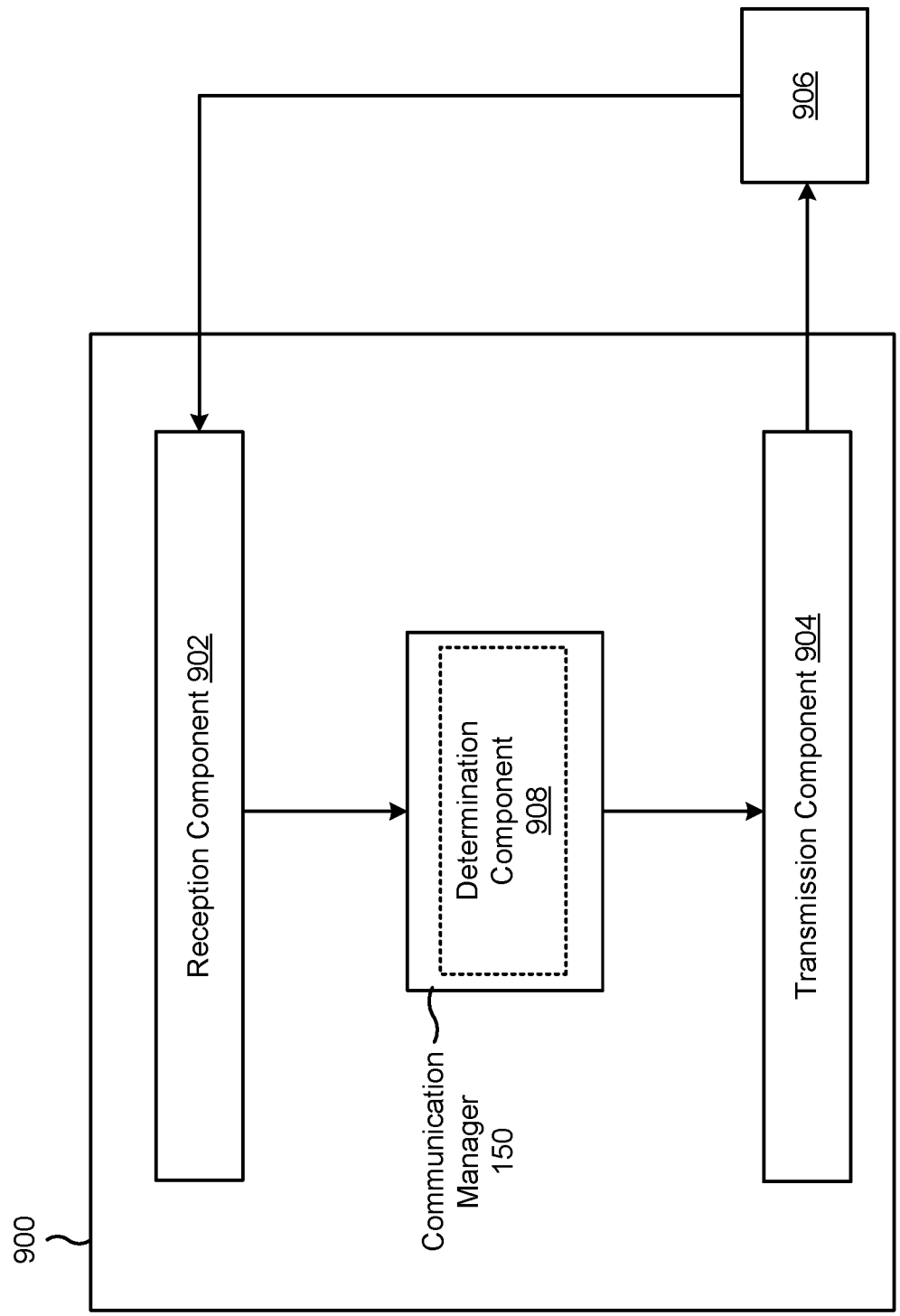

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a determination component 908, among other examples.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, DCI that schedules a communication, the DCI indicating information for one or more parameters of the communication using differential information associated with information included in an anchor DCI. The transmission component 904 may transmit, or the reception component 902 may receive, the communication based at least in part on transmitting the DCI.

The determination component 908 may determine that DCI that uses differential information may be used to schedule the communication. The determination component 908 may select a DCI format that is associated with using differential information (e.g., to be used for the DCI). The determination component 908 may determine the differential information to be indicated by the DCI to schedule the communication.

The transmission component 904 may transmit, to the UE, the anchor DCI indicating a first value for a parameter of the one or more parameters.

The determination component 908 may select a DCI format, for the DCI, that uses differential information based at least in part on a second value for the parameter, that is to be indicated in the DCI, being the same as the first value or within a threshold amount of the first value.

The transmission component 904 may transmit, to the UE, an indication that feedback information is to be provided for DCI that does not include differential information.

The transmission component 904 may transmit, to the UE, the anchor DCI. The reception component 902 may receive, from the UE, feedback information associated with the anchor DCI indicating that the anchor DCI was successfully decoded, wherein transmitting the DCI is based at least in part on receiving the feedback information.

The transmission component 904 may transmit, to the UE, the anchor DCI, wherein transmitting the DCI comprises transmitting the anchor DCI regardless of whether information associated with the anchor DCI is received by the base station.

The reception component 902 may receive an indication that the UE supports a DCI format associated with using differential information, wherein transmitting the DCI is based at least in part on receiving the indication that the UE supports the DCI format.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving downlink control information (DCI) that schedules a communication, wherein the DCI indicates information for one or more parameters of the communication using differential information associated with information included in an anchor DCI; and transmitting or receiving the communication based at least in part on receiving the DCI.

Aspect 2: The method of Aspect 1, wherein the DCI uses a format associated with using differential information.

Aspect 3: The method of any of Aspects 1-2, wherein a field associated with a parameter of the one or more parameters is not included in the DCI, and wherein transmitting or receiving the communication comprises: transmitting or receiving the communication using a value for the parameter that is indicated by the anchor DCI.

Aspect 4: The method of any of Aspects 1-3, wherein the DCI indicates a modification for a value of a parameter relative to the value of the parameter that is indicated to the UE, and wherein transmitting or receiving the communication comprises: transmitting or receiving the communication using a modified value for the parameter based at least in part on the modification indicated by the DCI.

Aspect 5: The method of any of Aspects 1-4, further comprising: receiving, from a base station, an indication that feedback information is to be provided for DCI that does not include differential information; receiving, from the base station, the anchor DCI; and transmitting, to the base station, feedback information associated with the anchor DCI indicating that the anchor DCI was successfully decoded, wherein receiving the DCI is based at least in part on transmitting the feedback information.

Aspect 6: The method of any of Aspects 1-5, wherein the differential information indicates that information indicated by the anchor DCI is to be reused or indicates a modification of information indicated by the anchor DCI.

Aspect 7: The method of any of Aspects 1-6, further comprising: transmitting an indication that the UE supports a DCI format associated with using differential information, wherein receiving the DCI is based at least in part on transmitting the indication that the UE supports the DCI format.

Aspect 8: The method of any of Aspects 1-7, wherein the one or more parameters include at least one of: a carrier indicator, a bandwidth part indicator, a frequency domain resource allocation, a time domain resource allocation, a virtual resource block (VRB) to physical resource block (PRB) mapping, a PRB bundling size indicator, a rate matching indicator, a modulation and coding scheme, an antenna port indicator, or a transmission configuration indication.

Aspect 9: The method of any of Aspects 1-8, wherein the communication is a downlink communication, and wherein transmitting or receiving the communication comprises receiving the communication based at least in part on receiving the DCI.

Aspect 10: The method of any of Aspects 1-8, wherein the communication is an uplink communication, and wherein transmitting or receiving the communication comprises transmitting the communication based at least in part on receiving the DCI.

Aspect 11: A method of wireless communication performed by a base station, comprising: transmitting, to a user equipment (UE) downlink control information (DCI) that schedules a communication, wherein the DCI indicates information for one or more parameters of the communication using differential information associated with information included in an anchor DCI; and transmitting or receiving the communication based at least in part on transmitting the DCI.

Aspect 12: The method of Aspect 11, wherein the DCI uses a format associated with using differential information.

Aspect 13: The method of any of Aspects 11-12, further comprising: transmitting, to the UE, the anchor DCI indicating a first value for a parameter of the one or more parameters; and selecting a DCI format, for the DCI, that uses differential information based at least in part on a second value for the parameter, that is to be indicated in the DCI, being the same as the first value or within a threshold amount of the first value.

Aspect 14: The method of any of Aspects 11-13, wherein a field associated with a parameter of the one or more parameters is not included in the DCI, and wherein transmitting or receiving the communication comprises: transmitting or receiving the communication using a value for the parameter that is indicated by the anchor DCI.

Aspect 15: The method of any of Aspects 11-14, wherein the DCI indicates a modification for a value of a parameter relative to the value of the parameter that is indicated to the UE, and wherein transmitting or receiving the communication comprises: transmitting or receiving the communication using a modified value for the parameter based at least in part on the modification indicated by the DCI.

Aspect 16: The method of any of Aspects 11-15, further comprising: transmitting, to the UE, an indication that feedback information is to be provided for DCI that does not include differential information; transmitting, to the UE, the anchor DCI; and receiving, from the UE, feedback information associated with the anchor DCI indicating that the anchor DCI was successfully decoded, wherein transmitting the DCI is based at least in part on receiving the feedback information.

Aspect 17: The method of any of Aspects 11-15, further comprising: transmitting, to the UE, the anchor DCI, wherein transmitting the DCI comprises transmitting the anchor DCI regardless of whether information associated with the anchor DCI is received by the base station.

Aspect 18: The method of any of Aspects 11-17, wherein the differential information indicates that information indicated by the anchor DCI is to be reused or indicates a modification of information indicated by the anchor DCI.

Aspect 19: The method of any of Aspects 11-18, further comprising: receiving an indication that the UE supports a DCI format associated with using differential information, wherein transmitting the DCI is based at least in part on receiving the indication that the UE supports the DCI format.

Aspect 20: The method of any of Aspects 11-19, wherein the one or more parameters include at least one of: a carrier indicator, a bandwidth part indicator, a frequency domain resource allocation, a time domain resource allocation, a virtual resource block (VRB) to physical resource block (PRB) mapping, a PRB bundling size indicator, a rate matching indicator, a modulation and coding scheme, an antenna port indicator, or a transmission configuration indication.

Aspect 21: The method of any of Aspects 11-20, wherein the communication is a downlink communication, and wherein transmitting or receiving the communication comprises transmitting the communication based at least in part on transmitting the DCI.

Aspect 22: The method of any of Aspects 11-20, wherein the communication is an uplink communication, and wherein transmitting or receiving the communication comprises receiving the communication based at least in part on transmitting the DCI.

Aspect 23: An apparatus for wireless communication at a device, comprising a processor; memory coupled with the processor; and instructions stored in the memory and executable by the processor to cause the apparatus to perform the method of one or more of Aspects 1-10.

Aspect 24: A device for wireless communication, comprising a memory and one or more processors coupled to the memory, the one or more processors configured to perform the method of one or more of Aspects 1-10.

Aspect 25: An apparatus for wireless communication, comprising at least one means for performing the method of one or more of Aspects 1-10.

Aspect 26: A non-transitory computer-readable medium storing code for wireless communication, the code comprising instructions executable by a processor to perform the method of one or more of Aspects 1-10.

Aspect 27: A non-transitory computer-readable medium storing a set of instructions for wireless communication, the set of instructions comprising one or more instructions that, when executed by one or more processors of a device, cause the device to perform the method of one or more of Aspects 1-10.

Aspect 28: An apparatus for wireless communication at a device, comprising a processor; memory coupled with the processor; and instructions stored in the memory and executable by the processor to cause the apparatus to perform the method of one or more of Aspects 11-22.

Aspect 29: A device for wireless communication, comprising a memory and one or more processors coupled to the memory, the one or more processors configured to perform the method of one or more of Aspects 11-22.

Aspect 30: An apparatus for wireless communication, comprising at least one means for performing the method of one or more of Aspects 11-22.

Aspect 31: A non-transitory computer-readable medium storing code for wireless communication, the code comprising instructions executable by a processor to perform the method of one or more of Aspects 11-22.

Aspect 32: A non-transitory computer-readable medium storing a set of instructions for wireless communication, the set of instructions comprising one or more instructions that, when executed by one or more processors of a device, cause the device to perform the method of one or more of Aspects 11-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting an indication that the UE supports a downlink control information (DCI) format associated with using differential information;
    receiving DCI that schedules a communication based at least in part on transmitting the indication that the UE supports the DCI format, wherein the DCI indicates information for one or more parameters of the communication using differential information associated with information included in an anchor DCI; and
    transmitting or receiving the communication based at least in part on receiving the DCI.

2. The method of claim 1, wherein a field associated with a parameter of the one or more parameters is not included in the DCI, and wherein transmitting or receiving the communication comprises:
    transmitting or receiving the communication using a value for the parameter that is indicated by the anchor DCI.

3. The method of claim 1, wherein the DCI indicates a modification for a value of a parameter relative to the value of the parameter that is indicated to the UE, and wherein transmitting or receiving the communication comprises:
    transmitting or receiving the communication using a modified value for the parameter based at least in part on the modification indicated by the DCI.

4. The method of claim 1, further comprising:
    receiving, from a network entity, an indication that feedback information is to be provided for a DCI communication that does not include differential information;
    receiving, from the network entity, the anchor DCI; and
    transmitting, to the network entity, feedback information associated with the anchor DCI indicating that the anchor DCI was successfully decoded,
    wherein receiving the DCI is based at least in part on transmitting the feedback information associated with the anchor DCI.

5. The method of claim 1, wherein the differential information associated with the information included in the anchor DCI indicates that the information included in the anchor DCI is to be reused or indicates a modification of the information included in the anchor DCI.

6. The method of claim 1, further comprising:
    receiving configuration information; and
    wherein transmitting the indication that the UE supports the DCI format is based at least in part on receiving the configuration information.

7. The method of claim 1, further comprising:
    receiving the anchor DCI, wherein the anchor DCI includes an indication to transmit feedback information indicating that the anchor DCI was successfully decoded; and
    transmitting the feedback information,
    wherein receiving the DCI is based at least in part on transmitting the feedback information.

8. A method of wireless communication performed by a base network entity, comprising:
    transmitting, to a user equipment (UE), an anchor downlink control information (DCI);
    transmitting, to a the UE, DCI that schedules a communication regardless of whether feedback information associated with the anchor DCI is received by the network entity, wherein the DCI indicates information for one or more parameters of the communication using differential information associated with information included in the anchor DCI; and
    transmitting or receiving the communication based at least in part on transmitting the DCI.

9. The method of claim 8, wherein the DCI uses a format associated with using differential information.

10. The method of claim 8, wherein the anchor DCI indicates a first value for a parameter of the one or more parameters; and
    wherein the method further comprises:
        selecting a DCI format, for the DCI, that uses differential information based at least in part on a second value for the parameter, that is to be indicated in the DCI, being the same as the first value or within a threshold amount of the first value.

11. The method of claim 8, wherein a field associated with a parameter of the one or more parameters is not included in the DCI, and wherein transmitting or receiving the communication comprises:
    transmitting or receiving the communication using a value for the parameter that is indicated by the anchor DCI.

12. The method of claim 8, wherein the DCI indicates a modification for a value of a parameter relative to the value of the parameter that is indicated to the UE, and wherein transmitting or receiving the communication comprises:
    transmitting or receiving the communication using a modified value for the parameter based at least in part on the modification indicated by the DCI.

13. The method of claim 8, further comprising:
transmitting, to the UE, an indication that feedback information is to be provided for a DCI communication that does not include differential information; and
receiving, from the UE, the feedback information associated with the anchor DCI indicating that the anchor DCI was successfully decoded,
wherein transmitting the DCI is based at least in part on receiving the feedback information associated with the anchor DCI.

14. The method of claim 8, further comprising:
receiving an indication that the UE supports a DCI format associated with using differential information,
wherein transmitting the DCI is based at least in part on receiving the indication that the UE supports the DCI format.

15. The method of claim 8, further comprising:
transmitting configuration information indicating that the UE is transmit an indication of UE capability to receive a DCI communication that uses differential information; and
receiving the indication of the UE capability,
wherein transmitting the DCI is based at least in part on receiving the indication of the UE capability.

16. The method of claim 8, further comprising:
determining that the UE supports a DCI format associated with using differential information,
wherein transmitting the DCI is based at least in part on determining that the UE supports the DCI format.

17. A user equipment (UE) for wireless communication, comprising:
one or more memories; and
one or more processors, coupled to the one or more memories, configured to:
transmit an indication that the UE supports a downlink control information (DCI) format associated with using differential information;
receive DCI that schedules a communication based at least in part on the indication, wherein the DCI indicates information for one or more parameters of the communication using differential information associated with information included in an anchor DCI; and
transmit or receive the communication based at least in part on the DCI.

18. The UE of claim 17, wherein a field associated with a parameter of the one or more parameters is not included in the DCI, and wherein the one or more processors, to transmit or receive the communication, are configured to:
transmit or receive the communication using a value for the parameter that is indicated by the anchor DCI.

19. The UE of claim 17, wherein the DCI indicates a modification for a value of a parameter relative to the value of the parameter that is indicated to the UE, and wherein the one or more processors, to transmit or receive the communication, are configured to:
transmit or receive the communication using a modified value for the parameter based at least in part on the modification indicated by the DCI.

20. The UE of claim 17, wherein the one or more processors are further configured to:
receive, from a network entity station, an indication that feedback information is to be provided for a DCI communication that does not include differential information;
receive, from the network entity station, the anchor DCI; and
transmit, to the network entity station, feedback information associated with the anchor DCI indicating that the anchor DCI was successfully decoded,
wherein receiving the DCI is based at least in part on transmitting the feedback information associated with the anchor DCI.

21. The UE of claim 17, wherein the differential information associated with the information included in the anchor DCI indicates that the information included in the anchor DCI is to be reused or indicates a modification of the information included in the anchor DCI.

22. The UE of claim 17, wherein the one or more processors are further configured to:
receive configuration information; and
wherein the one or more processors, to transmit the indication that the UE supports the DCI format, is configured to:
transmit the indication that the UE supports the DCI format based at least in part on the configuration information.

23. The UE of claim 17, wherein the one or more processors are further configured to:
receive the anchor DCI, wherein the anchor DCI includes an indication to transmit feedback information indicating that the anchor DCI was successfully decoded; and
transmit the feedback information,
wherein the one or more processors, to receive the DCI, is configured to:
receive the DCI based at least in part on the feedback information.

24. A network entity for wireless communication, comprising:
one or more memories; and
one or more processors, coupled to the one or more memories, configured to:
transmit, to a user equipment (UE), an anchor downlink control information (DCI);
transmit, to the UE, DCI that schedules a communication regardless of whether feedback information associated with the anchor DCI is received, wherein the DCI indicates information for one or more parameters of the communication using differential information associated with information included in the anchor DCI; and
transmit or receive the communication based at least in part on the DCI.

25. The network entity of claim 24, wherein the DCI uses a format associated with using differential information.

26. The network entity of claim 24, wherein the anchor DCI indicates a first value for a parameter of the one or more parameters; and
wherein the one or more processors are further configured to:
select a DCI format, for the DCI, that uses differential information based at least in part on a second value for the parameter, that is to be indicated in the DCI, being the same as the first value or within a threshold amount of the first value.

27. The network entity of claim 24, wherein a field associated with a parameter of the one or more parameters is not included in the DCI, and wherein the one or more processors, to transmit or receive the communication, are configured to:
transmit or receive the communication using a value for the parameter that is indicated by the anchor DCI.

28. The network entity of claim 24, wherein the DCI indicates a modification for a value of a parameter relative to the value of the parameter that is indicated to the UE, and wherein the one or more processors, to transmit or receive the communication, are configured to:

transmit or receive the communication using a modified value for the parameter based at least in part on the modification indicated by the DCI.

29. The network entity of claim 24, wherein the one or more processors are further configured to:

transmit, to the UE, an indication that feedback information is to be provided for a DCI communication that does not include differential information; and receive, from the UE, the feedback information associated with the anchor DCI indicating that the anchor DCI was successfully decoded, wherein transmitting the DCI is based at least in part on receiving the feedback information associated with the anchor DCI.

30. The network entity of claim 24, wherein the one or more processors are further configured to:

receive an indication that the UE supports a DCI format associated with using differential information, wherein transmitting the DCI is based at least in part on receiving the indication that the UE supports the DCI format.

* * * * *